United States Patent
Kang et al.

(10) Patent No.: US 8,135,335 B2
(45) Date of Patent: Mar. 13, 2012

(54) APPARATUS AND METHOD FOR PROCESSING TRANSMISSION INFORMATION OF BROADCAST MESSAGE CONSTITUTED BY RELAY STATION (RS) IN MULTIHOP RELAY BROADBAND WIRELESS ACCESS (BWA) COMMUNICATION SYSTEM

(75) Inventors: Hyun-Jeong Kang, Seoul (KR); Jung-Je Son, Yongin-si (KR); Taori Rakesh, Suwon-si (KR); Chang-Yoon Oh, Yongin-si (KR); Yeong-Moon Son, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 879 days.

(21) Appl. No.: 12/166,879

(22) Filed: Jul. 2, 2008

(65) Prior Publication Data

US 2009/0011784 A1   Jan. 8, 2009

(30) Foreign Application Priority Data

Jul. 5, 2007  (KR) ................. 10-2007-0067534

(51) Int. Cl.
*H04B 7/14* (2006.01)
*H04B 3/36* (2006.01)
*H04B 7/15* (2006.01)
(52) U.S. Cl. .............................. 455/7; 455/11.1; 455/15
(58) Field of Classification Search ................ 455/7, 15, 455/16, 11.1
See application file for complete search history.

(56) References Cited

U.S. PATENT DOCUMENTS

| 2008/0108303 | A1  | 5/2008 | Okuda |
| 2008/0108355 | A1  | 5/2008 | Oleszcsuk |
| 2008/0259857 | A1* | 10/2008 | Zheng ........................... 370/329 |
| 2008/0285500 | A1* | 11/2008 | Zhang et al. .................. 370/315 |

FOREIGN PATENT DOCUMENTS

| JP | 2002-271256 | 9/2002 |
| JP | 2004-274185 | 9/2004 |
| JP | 2008-118500 | 5/2008 |
| JP | 2008-118659 | 5/2008 |
| KR | 1020070038875 | 4/2007 |
| KR | 1020070073626 | 7/2007 |
| KR | 1020070117140 | 12/2007 |
| WO | WO 2007/036166 | 4/2007 |
| WO | WO 2007/053948 | 5/2007 |
| WO | WO 2009/009511 | 1/2009 |

* cited by examiner

*Primary Examiner* — Tilahun B Gesesse
(74) *Attorney, Agent, or Firm* — The Farrell Law Firm P.C.

(57) ABSTRACT

An apparatus and a method for processing transmission information of a broadcast message constituted by a Relay Station (RS) in a multihop relay Broadband Wireless Access (BWA) communication system are provided. A communication method of the RS includes composing a message to be sent to a Mobile Station (MS); transmitting a scheduling request message which includes information required to schedule the composed message, to a Base Station (BS); and receiving an allocation message which includes information to transmit the composed message, from the BS in response to the scheduling request message.

30 Claims, 7 Drawing Sheets

APPARATUS AND METHOD FOR PROCESSING TRANSMISSION INFORMATION OF BROADCAST MESSAGE CONSTITUTED BY RELAY STATION (RS) IN MULTIHOP RELAY BROADBAND WIRELESS ACCESS (BWA) COMMUNICATION SYSTEM

PRIORITY

This application claims priority under 35 U.S.C. §119(a) to a Korean patent application filed in the Korean Intellectual Property Office on Jul. 5, 2007 and assigned Serial No. 2007-67534, the entire disclosure of which is hereby incorporated by reference.

BACKGROUND OF THE INVENTION

1. Field of the Invention

The present invention relates generally to a multihop relay Broadband Wireless Access (BWA) communication system. More particularly, the present invention relates to an apparatus and a method for a relay station to transmit to a base station information for the transmission of a broadcast message composed by the relay station and for the base station to inform the relay station of transmission region information of the broadcast message.

2. Description of the Related Art

A fourth generation (4G) communication system, which is a next-generation communication system, aims to provide users with services of various Quality of Service (QoS) levels at a data rate of about 100 Mbps. Particularly, present-day 4 G communication systems are advancing in order to guarantee mobility and QoS in Broadband Wireless Access (BWA) communication systems such as Local Area Network (LAN) systems and Metropolitan Area Network (MAN) systems. Representative examples include an Institute of Electrical and Electronics Engineers (IEEE) 802.16d communication system and an IEEE 802.16e communication system.

The IEEE 802.16d communication system and the IEEE 802.16e communication system adopt Orthogonal Frequency Division Multiplexing (OFDM)/Orthogonal Frequency Division Multiple Access (OFDMA) schemes for physical channels. The IEEE 802.16d communication system considers only the fixed status of a current Subscriber Station (SS), that is, takes into account only a single-cell structure without considering the mobility of the SS. By contrast, the IEEE 802.16e communication system considers the mobility of the terminal. A mobile terminal is referred to herein as a Mobile Station (MS).

FIG. 1 illustrates a simplified structure of the general IEEE 802.16e communication system.

The IEEE 802.16e communication system has a multi-cell structure, that is, covers a cell 100 and a cell 150. The IEEE 802.16e communication system includes a Base Station (BS) 110 which manages the cell 100, a BS 140 which manages the cell 150, and MSs 111, 113, 130, 151, and 153. Between the BSs 110 and the 140 and the MSs 111, 113, 130, 151 and 153, signals are transmitted and received according to the OFDM/OFDMA scheme. Of the MSs 111, 113, 130, 151 and 153, the MS 130 travels within a boundary between the cell 100 and the cell 150, that is, within a handover area. When the MS 130 moves to the cell 150 managed by the BS 140 while transmitting and receiving signals with the BS 110, its serving BS is changed from the BS 110 to the BS 140.

Since the signaling is conducted between the fixed BS and the MS over the direct link as shown in FIG. 1, the IEEE 802.16e communication system can easily establish a radio communication link of high reliability between the BS and the MS. However, because of the fixed BS, the IEEE 802.16e communication system is subject to a low flexibility in the wireless network configuration. Thus, in a radio environment under several changes of traffic distribution or traffic requirement, the IEEE 802.16e communication system hardly provides for an efficient communication service.

To overcome these shortcomings, using a stationary or mobile Relay Station (RS) or the general MSs, multihop relay data transmission can be applied to a general wireless cellular communication system such as IEEE 802.16e communication system. The multihop relay wireless communication system can reconfigure the network by promptly handling the communication environment change and operate the entire radio network more efficiently. For example, the multihop relay wireless communication system can expend the cell service coverage and increase the system capacity. In a bad channel condition between the BS and the MS, the multihop relay wireless communication system can establish a relay path via the RS by installing the RS between the BS and the MS, to thus provide the MS with a better radio channel. Also, by installing the RS in a cell boundary under the hostile communication condition, the multihop relay wireless communication system can provide a high-speed data channel to the MS and expand the cell service coverage area.

Now, a structure of the multihop relay wireless communication system for the service coverage area expansion of the BS is illustrated.

FIG. 2 depicts a simplified structure of a multihop relay broadband wireless communication system for the service coverage expansion of the BS.

The multihop relay wireless communication system of FIG. 2 has a multi-cell structure, that is, it covers a cell 200 and a cell 240. The multihop relay wireless communication system includes a BS 210 which manages the cell 200, a BS 250 which manages the cell 240, MSs 211 and 213 in the coverage area of the cell 200, MSs 221 and 223 managed by the BS 210 but out of the coverage area of the cell 200, an RS 220 which provides multihop relay paths between the BS 210 and the MSs 221 and 223 outside the coverage area 230, MSs 251, 253 and 255 in the coverage area of the cell 240, MSs 261 and 263 managed by the BS 250 but out of the coverage area 270 of the cell 240, and an RS 260 which provides multihop relay paths between the BS 250 and the MS 261 and 263. Between the BSs 210 and 250, the RSs 220 and 260, and the MSs 211, 213, 221, 223, 251, 253, 255, 261 and 263, signals are transmitted and received using the OFDM/OFDMA scheme.

Next, a structure of a multihop relay wireless communication system for the increase of the system capacity is described.

FIG. 3 illustrates a simplified structure of the multihop relay broadband wireless communication system for the increase of the system capacity.

The multihop relay wireless communication system of FIG. 3 includes a BS 310, MSs 311, 313, 321, 323, 331 and 333, and RSs 320 and 330 which provide multihop relay paths between the BS 310 and the MSs 311, 313, 321, 323, 331 and 333. Between the BS 310, the RSs 320 and 330, and the MSs 311, 313, 321, 323, 331 and 333, signals are transmitted and received using the OFDM/OFDMA scheme. The BS 310 manages a cell 300. The MSs 311, 313, 321, 323, 331 and 333 and the RSs 320 and 333 within the coverage of the cell 300 can transmit and receive signals directly to and from the BS 310.

However, some MSs 321, 323, 331 and 333 near the boundary of the cell 300 are subject to a low Signal to Noise Ratio (SNR) of direct links between the BS 310 and the MSs 321, 323, 331 and 333. The RSs 320 and 330 can raise the effective transfer rate of the MSs and increase the system capacity by providing high-speed data transmission paths to the MSs 321, 323, 331 and 333.

In the multihop relay broadband wireless communication system of FIG. 2 or FIG. 3, the RSs 220, 260, 320 and 330 can be infrastructure RSs installed by a service provider and managed by the BSs 210, 250 and 310 which is aware of the existence of the RSs in advance, or client RSs which serve as SSs (or MSs) or RSs in some cases. The RSs 220, 260, 320, 330 can be stationary, nomadic, or mobile like the MS.

The BS in the multihop relay system can schedule the communications with its managing RS and the communications between the RS and the MS. When the BS schedules both of the relay link between the BS and the RS and the access link between the RS and the MS, the scheduling is referred to as centralized scheduling. By contrast, when the RS directly schedules its MSs without the intervention of the BS, the scheduling is referred to as a distributed scheduling.

The RS can compose a broadcast message for its managing MSs by itself. In the centralized scheduling, the RS needs to inform the BS of information required to schedule the transmission of the broadcast message.

In more detail, when the system adopts the centralized scheduling and the RS itself composes the broadcast message, it is necessary to define a signaling process between the BS and the RS to support the transmission of the broadcast message.

SUMMARY OF THE INVENTION

An aspect of the present invention is to address at least the above mentioned problems and/or disadvantages and to provide at least the advantages described below. Accordingly, an aspect of the present invention is to provide an apparatus and a method for transmitting from the RS to a BS information required to schedule a broadcast message composed by an RS in a multihop relay wireless communication system.

Another aspect of the present invention is to provide an apparatus and a method for transmitting from a BS to the RS scheduling information of a broadcast message composed by an RS in a multihop relay wireless communication system.

Yet another aspect of the present invention is to provide an apparatus and a method for signaling between a BS and an RS to support transmission of a broadcast message when the RS composes the broadcast message in a multihop relay wireless communication system.

Still another aspect of the present invention is to provide an apparatus and a method for transmitting from the RS to a BS a bandwidth request header for a broadcast message composed by an RS in a multihop relay wireless communication system.

Further aspect of the present invention is to provide an apparatus and a method for transmitting from a BS to the RS a resource allocation message for a broadcast message composed by an RS in a multihop relay wireless communication system.

The above aspects are achieved by providing a communication method of an RS in a multihop relay wireless communication system. The method includes transmitting to a BS a scheduling request message to request bandwidth on RS access link for transmission of a message composed by the RS; and receiving from the BS an allocation message which comprises information for transmission of the message composed by the RS, in response to the scheduling request message.

According to one aspect of the present invention, a communication method of a BS in a multihop relay wireless communication system, includes receiving from the RS a scheduling request message to request bandwidth on RS access link for transmission of a message composed by an RS; determining a transmission region for the message composed by the RS using the information of the scheduling request message; and transmitting to the RS an allocation message which includes information for the transmission of the message composed by the RS, in response to the scheduling request message.

According to another aspect of the present invention, an RS in a multihop relay wireless communication system includes a message generator for generating a scheduling request message to request bandwidth on RS access link for transmission of a message composed by the RS; a transmitter for processing the scheduling request message output from the message generator in a physical layer and transmitting the scheduling request message to the BS; and a receiver for receiving an allocation message which includes information for the transmission of the composed by the RS in response to the scheduling request message.

According to yet another aspect of the present invention, a BS in a multihop relay wireless communication system includes a receiver for receiving a scheduling request message to request bandwidth on RS access link for the transmission of a message composed by an RS; a controller for determining a transmission region for the message composed by the RS using the information of the scheduling request message; a message generator for generating an allocation message which includes information for the transmission of the message composed by the RS, in response to the scheduling request message; and a transmitter for processing the allocation message in a physical layer and transmitting the allocation message to the RS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. The following description includes various specific details to assist in that understanding but are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a signaling process between a Base Station (BS) and a Relay Station (RS) to support transmission of a broadcast message when a centralized scheduling is adopted and the RS itself composes the broadcast message in a multihop relay broadband wireless communication system.

The RS sends bandwidth request message to the BS (MR-BS) to request bandwidth on its access link for the purpose of transmitting a broadcast message composed by the RS. The BS performs the scheduling for transmission of the broadcast message composed by the RS over access link to MS. The BS sends the scheduling information of the broadcast message to the RS. The RS broadcasts the broadcast message that the RS composed to Mobile Stations (MSs) according to the scheduling information.

Herein, the broadcast message can be, for example, a Downlink Channel Descriptor (DCD) message and an Uplink Channel Descriptor (UCD) message for broadcasting system parameter information, a neighbor advertisement (NBR-ADV) message for broadcasting information of neighbor BS/RSs, a ranging response (RNG-RSP) message, and so forth. Other broadcast messages are contemplated.

The multihop relay broadband wireless communication system adopts, for example, an Orthogonal Frequency Division Multiplexing (OFDM)/Orthogonal Frequency Division Multiple Access (OFDMA) scheme. Using the OFDM/OFDMA scheme, a high-speed data transmission is feasible by sending a physical channel signal using a plurality of subcarriers and the mobility of the MS can be supported by means of a multi-cell structure.

While the broadband wireless access communication system is illustrated by way of example, the present invention is applicable to any cellular communication systems using a multihop relay scheme.

Figure 1:
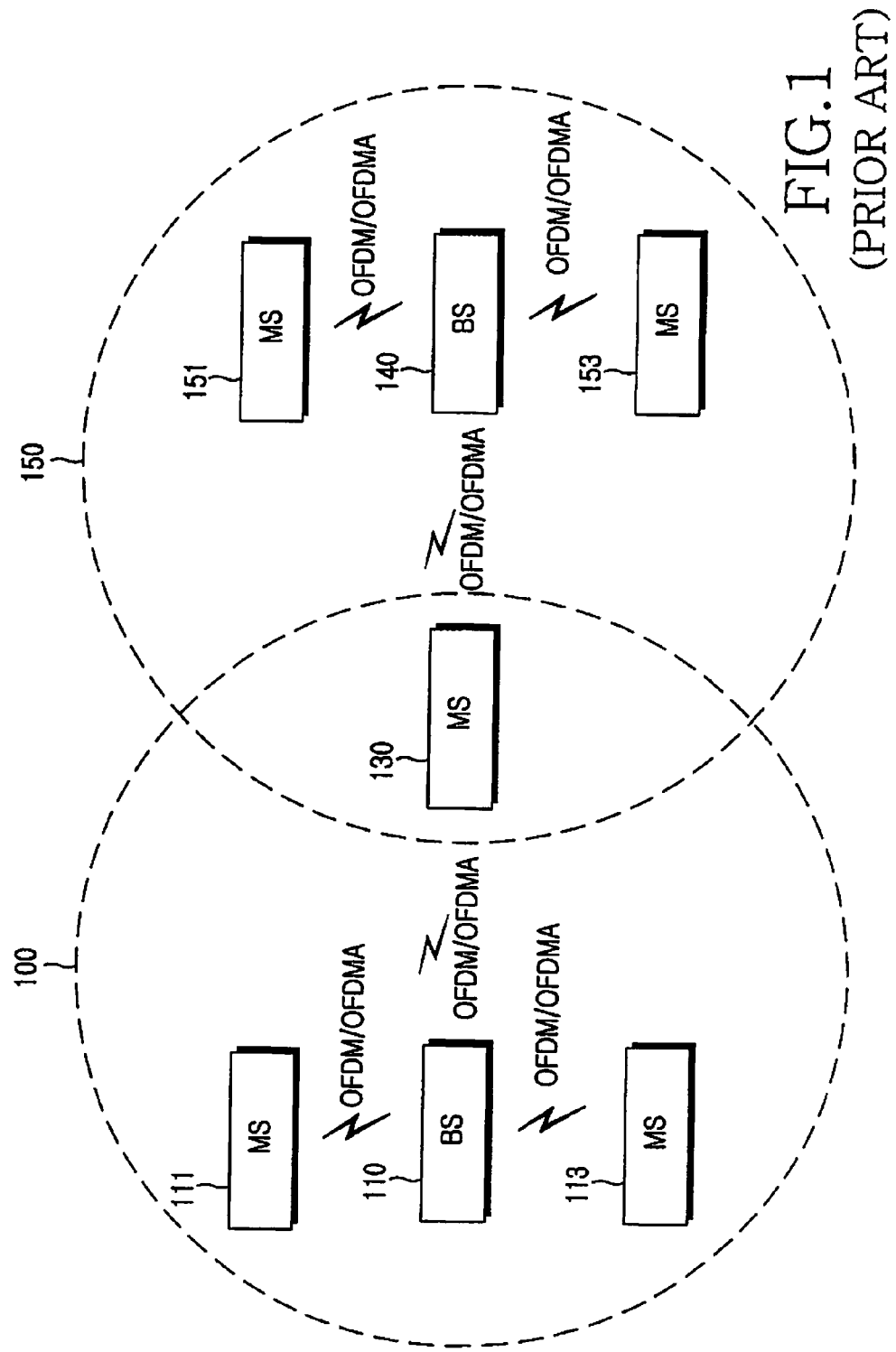
FIG. 1 illustrates a simplified structure of a general IEEE 802.16e communication system.
Figure 2:
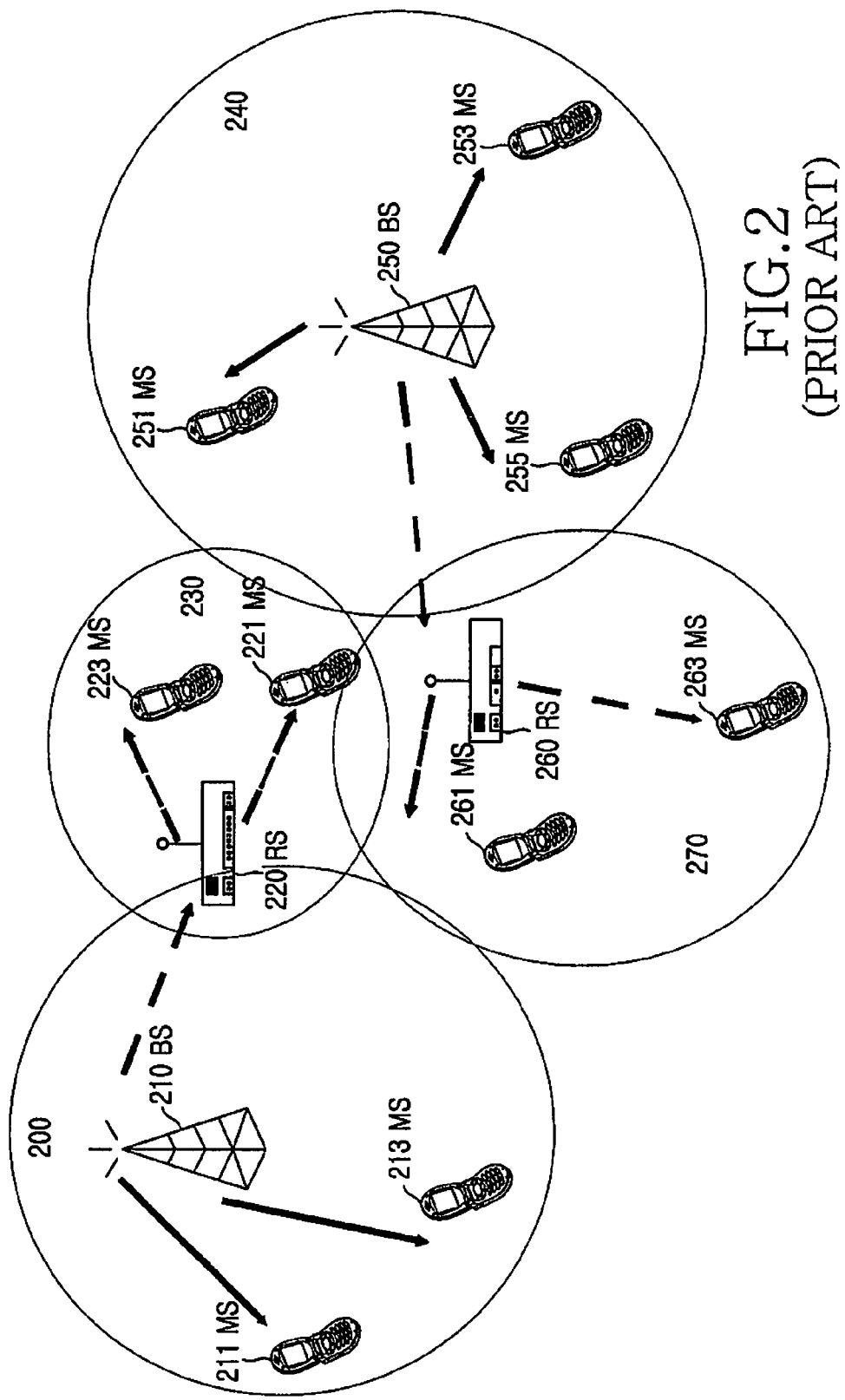
FIG. 2 illustrates a simplified structure of a multihop relay broadband wireless communication system for a service coverage area extension of a BS.
Figure 3:
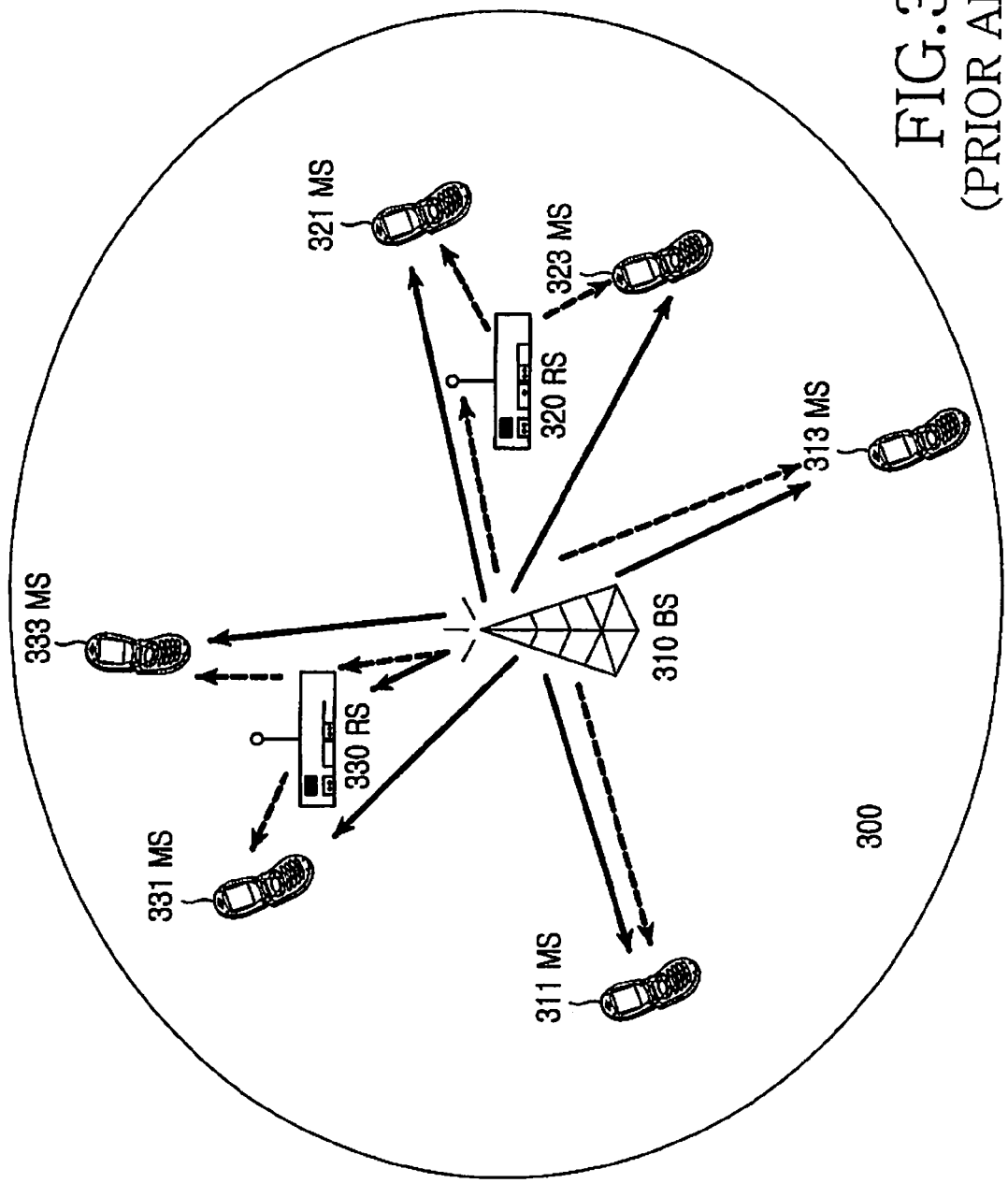
FIG. 3 illustrates a simplified structure of a multihop relay broadband wireless communication system for a system capacity increase.
Figure 4:
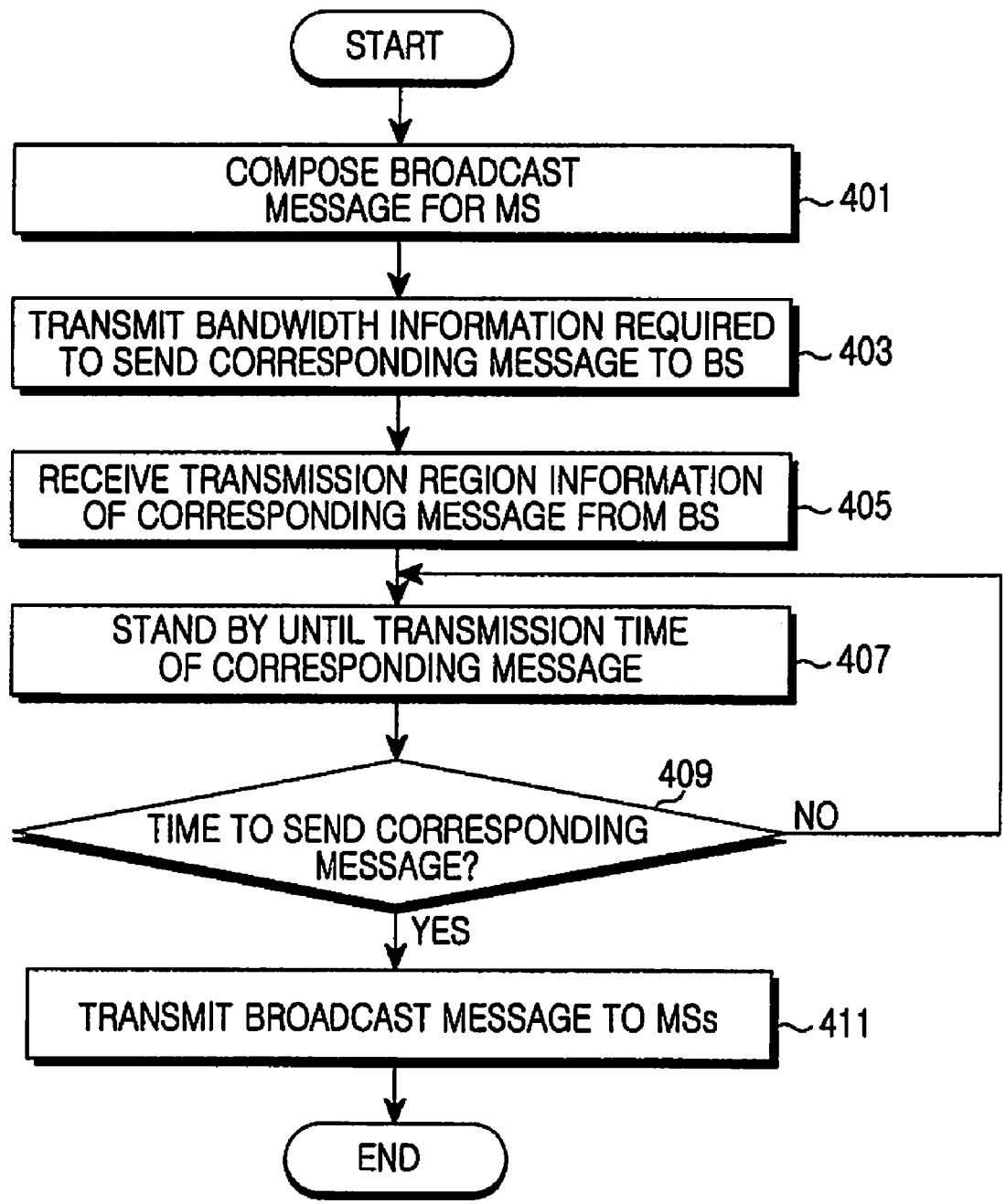
FIG. 4 illustrates operations of an RS in a multihop relay wireless communication system according to an exemplary embodiment of the present invention.

FIG. 4 illustrates operations of an RS in a multihop relay wireless communication system according to an exemplary embodiment of the present invention.

In step 401, the RS composes a broadcast message for MSs to which the RS provides the relay service. The broadcast message can be a MOB_NBR-ADV message for broadcasting neighbor BS/RS information, a DCD or UCD message for broadcasting channel configuration information of the access link between the RS and the MS, or the RNG-RSP message. To periodically transmit the broadcast message to the MS, it is assumed that a transmission period of the broadcast message is known to the RS and the BS in advance. The RS can compose the broadcast message by taking into account the transmission period of the broadcast message.

In step 403, the RS transmits to the BS a broadcast message bandwidth request message including bandwidth information required to transmit the broadcast message. By sending the bandwidth request message to the BS, the RS requests the scheduling to the BS. The structure of the Broadcast Message (BM) Bandwidth Request (BR) message is shown in Table 1.

TABLE 1

| Syntax | Notes |
| --- | --- |
| BM Bandwidth Info( ) { | |
| HT | Indicate header type |
| EC | Indicate encryption control |
| Type | Indicate extended MAC signaling header type II |
| Extended Type | Indicate BM BR header |
| TID | Transaction ID. MR-BS when indicating the region information in response to a BM BR header shall include the same TID in the BM_Alloc as in the BM BR header |
| DIUC | Indicate the DIUC used by RS to transmit the broadcast massage |
| BR | Request amount of bandwidth |
| CID | Basic CID (or tunnel CID) of the RS |
| HCS | header check sequence |
| } | |

In Table 1, the BM BR message includes BR information required to transmit the broadcast message composed by the RS, Downlink Interval Usage Code (DIUC) information corresponding to modulation and coding information to be applied to the broadcast message, Transaction IDentifier (TID) information to identify that a BM allocation message is a response to the BM BR message when the BM allocation message informing of scheduling information determined by the BS is received, and so on.

Table 1 shows the BM BR message composed using the format of "extended MAC signaling header type II" of the IEEE 802.16j. Instead of the MAC header, the BM BR message may be composed as a general message.

In step 405, the RS receives the BM allocation message from the BS in response to the BM BR message. The format of the BM allocation message is shown in Table 2.

TABLE 2

| Syntax | |
| --- | --- |
| BM_Alloc( ) { | |
| TID | Transaction ID |
| Frame number | Frame number to transmit the broadcast message |
| OFDMA symbol offset | |
| Subchannel offset | |
| No. OFDMA Symbols | |
| No. subchannels | |
| } | |

In Table 2, the BM allocation message includes TID information corresponding to the BM BR message of Table 1, a frame number for carrying the broadcast message, and region information (for example, OFDMA symbol offset, Subchannel offset, No. OFDMA Symbols, and No. Subchannels) for transmitting the broadcast message in frames corresponding to the frame number.

The BM allocation message can be transmitted in the form of a Relay zone (R)-MAP message transmitted from the BS to the RS, a general unicast message, or an extended subheader.

In step 407, the RS analyzes the BM allocation message and stands by until a point in time corresponding to the frame number of the BM allocation message. In step 409, the RS determines if it is a transmission time of the broadcast message by examining the current frame number. When it is the transmission time, the RS broadcasts its composed broadcast message to MSs in step 411. The broadcast message is delivered in regions according to the resource allocation information (OFDMA symbol offset, Subchannel offset, No. OFDMA Symbols, and No. Subchannels) of the BM allocation message.

Figure 5:
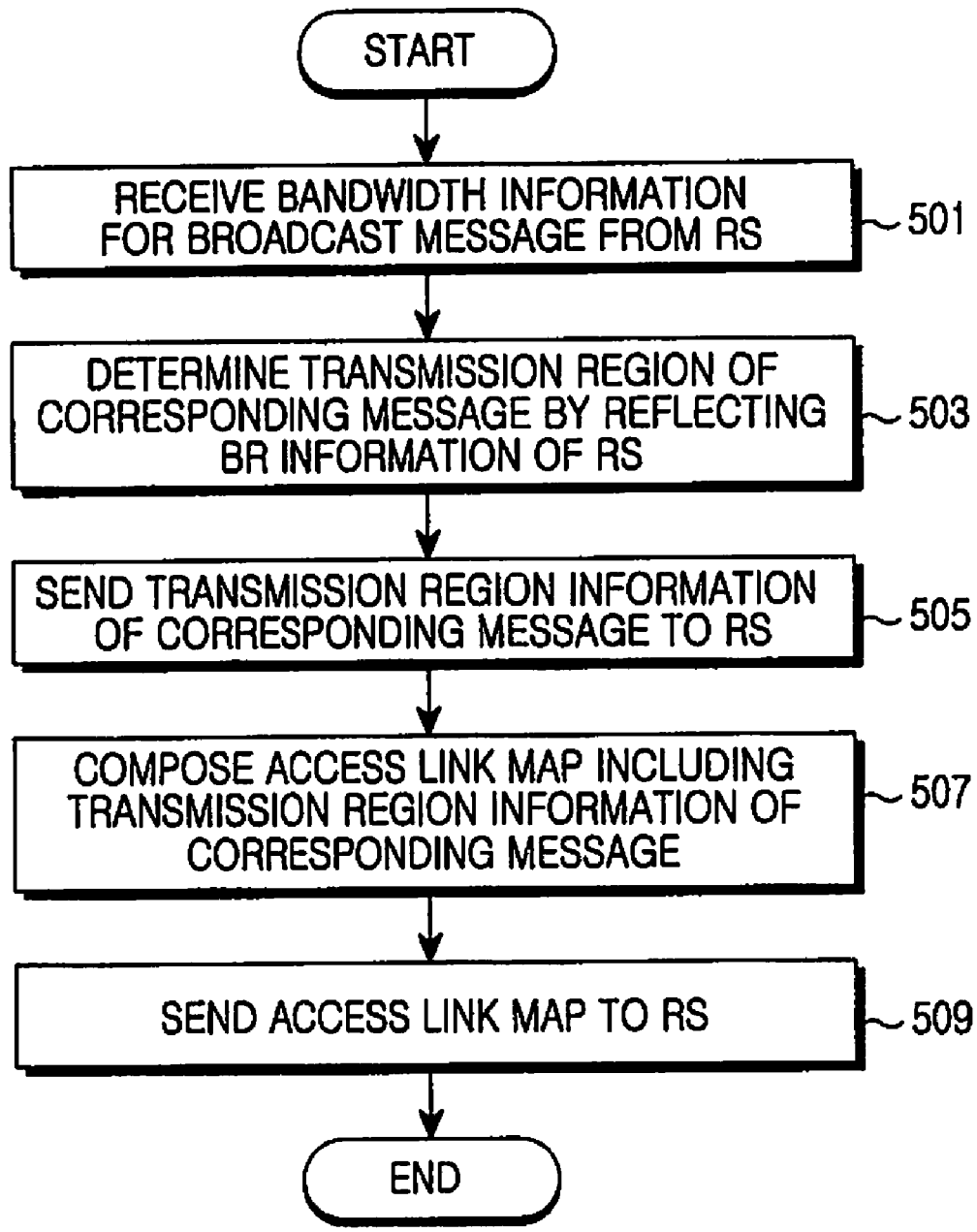
FIG. 5 illustrates operations of a BS in the multihop relay wireless communication system according to an exemplary embodiment of the present invention.

FIG. 5 illustrates operations of the BS in the multihop relay wireless communication system according to an exemplary embodiment of the present invention.

In step 501, the BS receives the BM BR message of Table 1 from the RS. In step 503, the BS analyzes the BM BR message and determines a transmission time and region (resources) of the broadcast message composed by the RS by referring to the information (DIUC, etc.) of the BM BR message.

Next, the BS composes the BM allocation message of Table 2 including the transmission point and region information of the broadcast message. In step 505, the BS transmits the BM allocation message to the RS.

In step 507, the BS composes an access link MAP message including resource allocation information (MAP Information Element (IE)) of the broadcast message. In step 509, the BS sends the MAP message to the RS. The MAP message includes region information of the broadcast message composed by the RS. Upon receiving the MAP message, the RS sends the MAP message to the MS at the time designated by the BS. If the BM allocation message does not include the region information of the broadcast message and merely includes an index of the MAP IE that contains the corresponding region information, the RS can acquire the region information of the broadcast message from k-th DL-MAP IE within the MAP message (k=IE index). The MAP message is processed in a typical procedure, which is not further illustrated.

Figure 6:
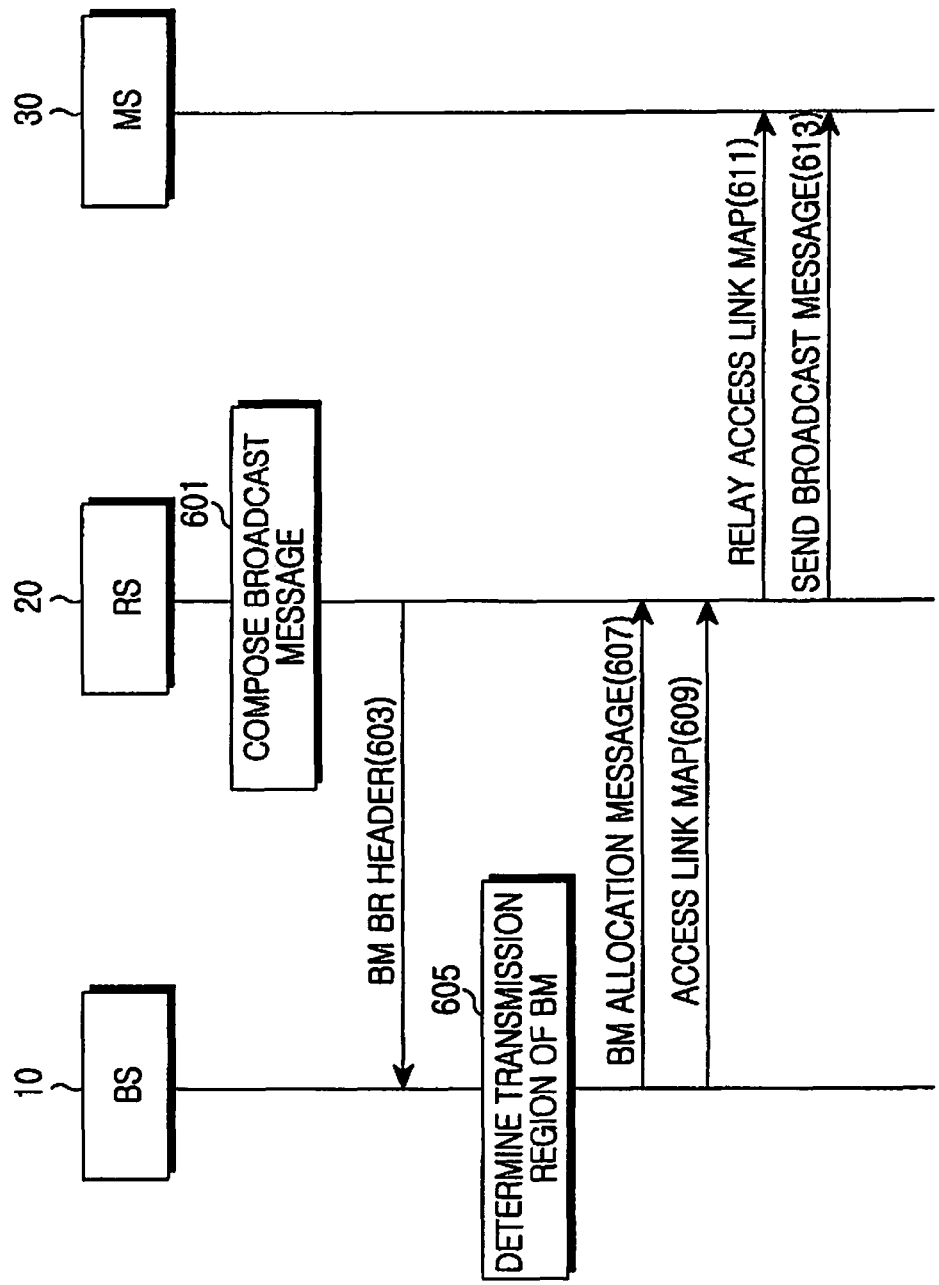
FIG. 6 illustrates a signaling exchange process between the BS and the RS in the multihop relay wireless communication system according to an exemplary embodiment of the present invention.

FIG. 6 illustrates a signaling exchange process between the BS and the RS in the multihop relay wireless communication system according to an exemplary embodiment of the present invention.

In step 601, the RS 20 composes the broadcast message to be transmitted to the MS over the access link. The broadcast message can be, for example, the DCD message, the UCD message, the RNG-RSP message, and the NBR-ADV message.

In step 603, the RS 20 transmits to the BS 10 the BM BR message of Table 1 including the bandwidth information required to transmit the broadcast message. Herein, the BM BR message can include the modulation and coding information (e.g., DIUC) to be applied to the broadcast message, the amount of bandwidth information required to transmit the broadcast message, and so forth.

In step 605, the BS 10 schedules the RS access link using the information of the BM BR message received from the RS 20 and determines the time and the region for transmitting the broadcast message based on the scheduling result.

In step 607, the BS 10 composes the BM allocation message of Table 2 including the transmission time and region of the broadcast message and transmits the composed BM allocation message to the RS 20. In step 609, the BS 10 composes the access link MAP with the access link scheduling result and sends the access link MAP to the RS 20. The access link MAP includes the allocation information (region information) of the broadcast message.

In step 611, the RS 20 relays the access link MAP to the MS 30 at the time designated by the BS 10. In step 613, the RS 20 broadcasts its composed broadcast message to the MS 30 at the corresponding time point in the corresponding region according to the information of the BM allocation message.

Figure 7:
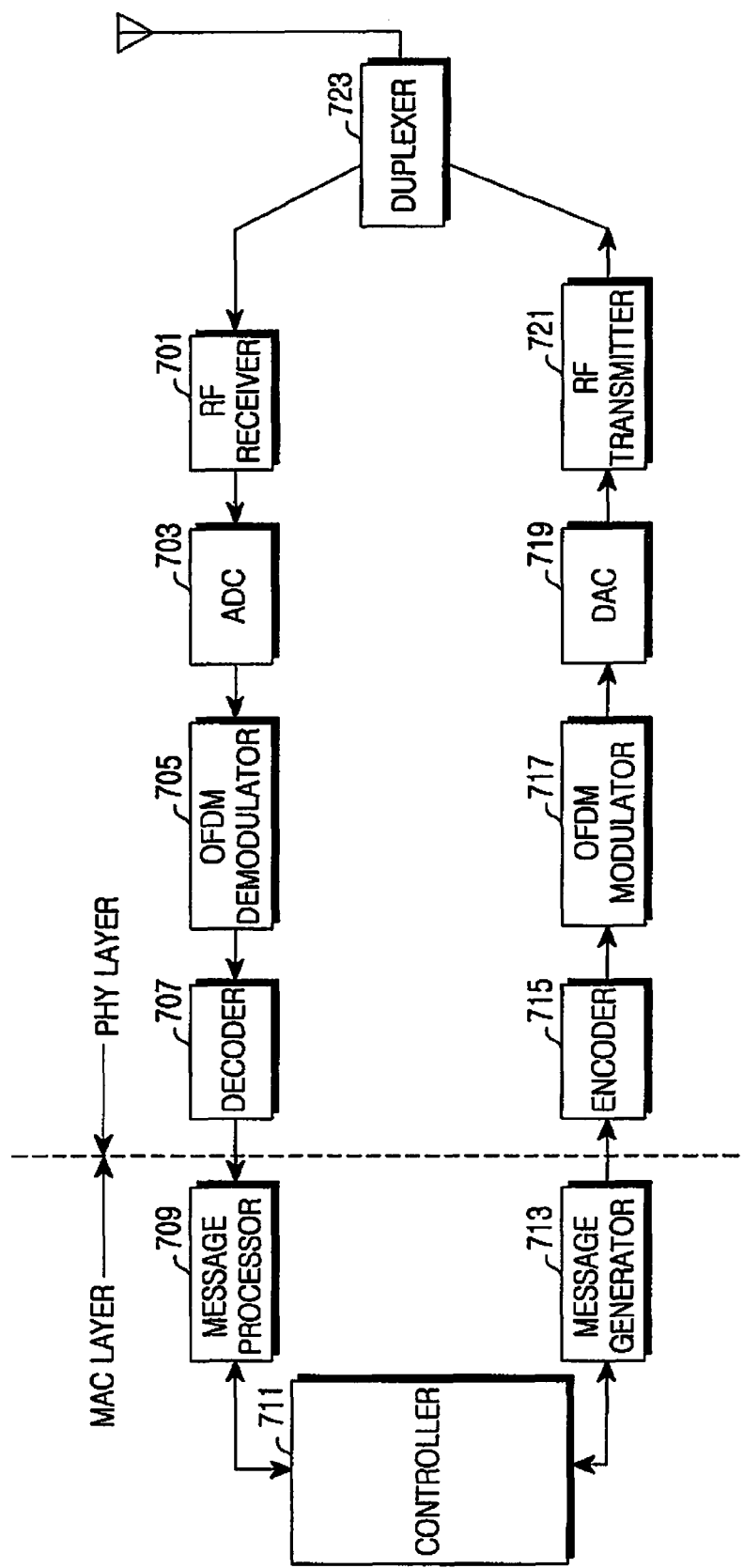
FIG. 7 illustrates a structure of the BS (or the RS) according to an exemplary embodiment of the present invention.

FIG. 7 is a block diagram of the BS (or the RS) according to an exemplary embodiment of the present invention. Herein, since the BS and the RS each include the same interface module (communication module) and have the identical block structure, operations of the BS and the RS are now described by referring to FIG. 7. While a Time Division Duplex (TDD)-OFDMA system is assumed, the present invention is applicable to a Frequency Division Duplex (FDD) system, a hybrid system using both of the TDD and the FDD, and cellular systems using other resource division schemes.

The BS (or the RS) includes a Radio Frequency (RF) receiver 701, an Analog-to-Digital Converter (ADC) 703, an OFDM demodulator 705, a decoder 707, a message processor 709, a controller 711, a message generator 713, an encoder 715, an OFDM modulator 717, a Digital-to-Analog Converter (DAC) 719, an RF transmitter 721, and a duplexer 723.

The duplexer 723 transmits a transmit signal output from the RF transmitter 721 via an antenna and provides a receive signal from the antenna to the RF receiver 701 according to a duplexing scheme. For example, in the TDD scheme, the duplexer 723 transmits a signal output from the RF transmitter 721 via the antenna in a transmission interval and forwards a signal received on the antenna to the RF receiver 701 in a reception interval.

The RF receiver 701 converts the RF signal received on the antenna to a baseband analog signal. The ADC 703 converts the analog signal output from the RF receiver 701 to sample data. The OFDM demodulator 705 converts the sample data output from the ADC 703 to frequency-domain data through a Fast Fourier Transform (FFT) process, and selects and outputs data of subcarriers to be actually received from the frequency-domain data.

The decoder 707 demodulates and decodes the data output from the OFDM demodulator 705 at a preset modulation (Modulation and Coding Scheme (MCS)) level.

The message processor 709 decomposes a control message fed from the decoder 707 and provides the result to the controller 711. The controller 711 performs a corresponding processing for information output from the message processor 709, and generates and provides information to transmit to the message generator 713. It is assumed that the controller 711 schedules resources. The message generator 713 composes a message with various information provided from the controller 711 and outputs to the encoder 715 of the physical layer.

The encoder 715 encodes and modulates the data output from the message generator 713 at the preset modulation (MCS) level. The OFDM modulator 717 outputs sample data (OFDM symbols) by applying Inverse FFT (IFFT) to the data output from the encoder 715. The DAC 719 converts the sample data to an analog signal. The RF transmitter 721 converts the analog signal output from the DAC 719 to an RF signal and transmits the RF signal over the antenna.

The controller 711, as a protocol controller, controls the message processor 709 and the message generator 713. That is, the controller 711 can functions as the message processor 709 and the message generator 713. They are separately provided to distinguish their respective functions. In the actual implementation, the controller 711 can process all or part of the message processor 709 and the message generator 713 functions.

The controller 711 receives necessary information from a corresponding component of the physical layer, or issues a control signal to a corresponding component of the physical layer in the process of the protocol processing.

Now, the operations of the BS and the RS are explained based on the structure of FIG. 7. Descriptions center on the signaling processing in the Media Access Control (MAC) layer.

First, the operations of the BS are illustrated.

The message processor 709 analyzes the BM BR message of Table 1 received from the RS and provides various control information extracted from the BM BR message to the controller 711.

The controller 711 receives the information of the BM BR message from the message processor 709 and performs the RS access link scheduling using the information of the BM BR message. The controller 711 determines the transmission time and the transmission region of the broadcast message transmitted in the RS access link according to the scheduling result, and provides the determined time and region to the message generator 713.

The message generator 713 composes the BM allocation message of Table 2 including the transmission time and region information of the broadcast message and provides the composed BM allocation message to the physical layer.

The controller 711 provides the RS access link scheduling result to the message generator 713. The message generator 713 composes the RS access link MAP message of the communications of the RS and the MS using the RS access link scheduling result and provides the RS access link MAP message to the physical layer. The RS access link MAP message includes the allocation information (or the region information) of the broadcast message.

The message composed at the message generator 713 is processed into a form transmittable in the physical layer and then transmitted to the RS.

Now, the operations of the RS are provided.

The controller 711 composes the broadcast message to be sent to the MS over the access link. The broadcast message can be, for example, the DCD message, the UCD message, and RNG-RSP message, and the NBR-ADV message. Next, the controller 711 generates information required for the scheduling of the broadcast message and provides the generated information to the message generator 713.

The message generator 713 composes the BM BR message of Table 1 including the information required for the scheduling and provides the composed message to the physical layer. The BM BR message is encoded in the physical layer and then transmitted to the BS. Herein, the BM BR message can include the modulation and coding information to be applied to the broadcast message, the bandwidth information required to deliver the broadcast message, and so on.

When receiving the BM allocation message in response to the BM BR message, the message processor 709 analyzes the BM allocation message and provides various control information extracted from the BM allocation message to the controller 711.

The controller 711 determines the transmission time and the transmission region of the broadcast message using the control information fed from the message processor 709. The controller 711 performs the corresponding control operation so as to transmit the broadcast message to the MS at the determined time in the determined region. The controller 711 receives the RS access link MAP message including the allocation information of the broadcast message from the BS, and performs the corresponding control operation to transmit the RS access link MAP message in the corresponding frame.

The broadcast message composed at the message generator 713 is provided to the physical layer under the control of the controller 711, encoded for the transmission at the determined time in the determined region, and then broadcast to the MS.

When the RS composes the broadcast message as above, the signaling process between the BS and the RS to support the transmission of the broadcast message has been explained. Note that the present invention is applicable to a unicast message composed by the RS.

As set forth above, when the scheduling between the BS and the RS is separately performed from the message composition, the information required to schedule the message composed by the RS is provided to the BS and the scheduling information determined at the BS is provided to the RS. Thus, it is possible to synchronize the data processing between the BS, the RS, and the MS which receives the relay service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method of a Relay Station (RS) in a multihop relay wireless communication system, the method comprising:
   transmitting to a Base Station (BS) a scheduling request message to request bandwidth on an RS access link for transmission of a message composed by the RS; and
   receiving from the BS an allocation message which includes information for transmission of the message composed by the RS, in response to the scheduling request message,
   wherein the scheduling request message includes the requested amount of bandwidth.

2. The communication method of claim 1, wherein the message composed by the RS is one of a broadcast message, a multicast message, and a unicast message.

3. The communication method of claim 1, wherein the message composed by the RS is one of a Downlink Channel Descriptor (DCD) message, an Uplink Channel Descriptor (UCD) message, and a Neighbor Advertisement (NBR-ADV) message.

4. The communication method of claim 1, wherein the scheduling request message further includes at least one of a Transaction IDentifier (TID) and Downlink Interval Usage Code (DIUC) used by RS to transmit the message.

5. The communication method of claim 1, wherein the scheduling request message has a structure of an extended Media Access Control (MAC) signaling header type II.

6. The communication method of claim 1, wherein the allocation message includes at least one of transmission time information of the message composed by the RS and a TID of the scheduling request message.

7. The communication method of claim 1, further comprising:
   receiving an RS access link MAP message which includes allocation information of the message composed by the RS, from the BS; and
   relaying the RS access link MAP message to the MS.

8. The communication method of claim 7, further comprising:
   composing a message to be sent to a Mobile Station (MS); and transmitting the composed message to the MS in an allocation region designated in the RS access link MAP message.

9. A communication method of a Base Station (BS) in a multihop relay wireless communication system, the method comprising:
receiving from a Relay Station (RS) a scheduling request message to request bandwidth on an RS access link for transmission of a message composed by the RS,
determining a transmission region for the message composed by the RS using information of the scheduling request message; and
transmitting to the RS an allocation message which includes information for transmission of the message composed by the RS, in response to the scheduling request message,
wherein the scheduling request message includes the requested amount of bandwidth.

10. The communication method of claim 9, wherein the message composed by the RS is one of a broadcast message, a multicast message, and a unicast message.

11. The communication method of claim 9, wherein the message composed by the RS is one of a Downlink Channel Descriptor (DCD) message, a Uplink Channel Descriptor (UCD) message, and a Neighbor Advertisement (NBR-ADV) message.

12. The communication method of claim 9, wherein the scheduling request message further includes at least one of a Transaction IDentifier (TID) and; Downlink Interval Usage Code (DIUC) used by the RS to transmit the message.

13. The communication method of claim 9, wherein the scheduling request message has a structure of an extended Media Access Control (MAC) signaling header type II.

14. The communication method of claim 9, wherein the allocation message includes at least one of transmission time information of the message composed by the RS and a TID of the scheduling request message.

15. The communication method of claim 9, further comprising:
generating an RS access link MAP message which includes allocation information of the message composed by the RS; and
transmitting the generated RS access link MAP message to the RS.

16. A Relay Station (RS) in a multihop relay wireless communication system, comprising:
a message generator for generating a scheduling request message to request bandwidth on RS access link for transmission of a message composed by the RS;
a transmitter for processing the scheduling request message output from the message generator in a physical layer and transmitting the scheduling request message to the BS; and
a receiver for receiving an allocation message, which includes information for the transmission of the message composed by the RS, in response to the scheduling request message,
wherein the scheduling request message includes the requested amount of bandwidth.

17. The RS of claim 16, wherein the message composed by the RS is one of a broadcast message, a multicast message, and a unicast message.

18. The RS of claim 16, wherein the message composed by the RS is one of a Downlink Channel Descriptor (DCD) message, an Uplink Channel Descriptor (UCD) message, and a Neighbor Advertisement (NBR-ADV) message.

19. The RS of claim 16, wherein the scheduling request message further includes at least one of a Transaction IDentifier (TID) and Downlink Interval Usage Code (DIUC) used by the RS to transmit the message.

20. The RS of claim 16, wherein the scheduling request message has a structure of an extended Media Access Control (MAC) signaling header type II.

21. The RS of claim 16, wherein the allocation message includes at least one of transmission time information of the message composed by the RS and a TID of the scheduling request message.

22. The RS of claim 16, wherein the receiver receives an RS access link MAP message which includes allocation information of the message composed by the RS from the BS, and
the transmitter relays the access link MAP message to the MS.

23. The RS of claim 22, wherein the message generator composes a message to be sent to a Mobile Station (MS), and
the transmitter transmits the composed message to the MS in an allocation region designated in the RS access link MAP.

24. A Base Station (BS) in a multihop relay wireless communication system, comprising:
a receiver for receiving a scheduling request message to request bandwidth on an RS access link for transmission of a message composed by a Relay Station (RS);
a controller for determining a transmission region for the message composed by the RS using information of the scheduling request message;
a message generator for generating an allocation message, which includes information for transmission of the message composed by the RS, in response to the scheduling request message; and
a transmitter for processing the allocation message in a physical layer and transmitting the allocation message to the RS,
wherein the scheduling request message includes the requested amount of bandwidth.

25. The BS of claim 24, wherein the message composed by the RS is one of a broadcast message, a multicast message, and a unicast message.

26. The BS of claim 24, wherein the message composed by the RS is one of a Downlink Channel Descriptor (DCD) message, an Uplink Channel Descriptor (UCD) message, and a Neighbor Advertisement (NBR-ADV) message.

27. The BS of claim 24, wherein the scheduling request message further includes at least one of a Transaction IDentifier (TID) and Downlink Interval Usage Code (DIUC) used by the RS to transmit the message.

28. The BS of claim 24, wherein the scheduling request message has a structure of an extended Media Access Control (MAC) signaling header type II.

29. The BS of claim 24, wherein the allocation message includes at least one of transmission time information of the message composed by the RS and a TID of the scheduling request message.

30. The BS of claim 24, wherein the message generator generates an RS access link MAP message, which includes allocation information of the message composed by the RS, and
the transmitter processes the RS access link MAP message in a physical layer and transmits the RS access link MAP message to the RS.

* * * * *